United States Patent [19]

Iwata et al.

[11] Patent Number: 4,646,815
[45] Date of Patent: Mar. 3, 1987

[54] HEAT EXCHANGE MAT

[75] Inventors: Hideo Iwata, Hirakata; Yoshiaki Kitagawa, Osaka; Jiro Koshijima, Takarazuka; Tetsuya Tachibana, Osaka, all of Japan

[73] Assignee: Matsushita Electric Works, Ltd., Osaka, Japan

[21] Appl. No.: 682,177

[22] Filed: Dec. 17, 1984

[30] Foreign Application Priority Data

Dec. 23, 1983 [JP] Japan ................... 58-250767
Jan. 20, 1984 [JP] Japan ..................... 59-9025
May 15, 1984 [JP] Japan .................... 59-98403

[51] Int. Cl.$^4$ ............................................. F24H 1/00
[52] U.S. Cl. ................................... 165/56; 237/69; 165/170
[58] Field of Search .............. 165/56, 49, 170, 46; 237/69

[56] References Cited

U.S. PATENT DOCUMENTS

| 3,331,169 | 7/1967 | Cumming et al. | 165/56 X |
| 3,640,283 | 2/1972 | Bhatia et al. | 165/46 X |
| 3,902,654 | 9/1975 | Bush | 165/46 |
| 4,230,175 | 10/1980 | Disselbeck et al. | 165/46 |

FOREIGN PATENT DOCUMENTS

| 3217578 | 11/1983 | Fed. Rep. of Germany | 165/56 |
| 85896 | 6/1980 | Japan | 165/49 |
| 130587 | 10/1981 | Japan | 165/56 |
| 157736 | 12/1981 | Japan | 165/56 |
| 16733 | 1/1982 | Japan | 165/56 |
| 16735 | 1/1982 | Japan | 165/56 |
| WO82/00058 | 6/1982 | PCT Int'l Appl. | |

Primary Examiner—William R. Cline
Assistant Examiner—Peggy A. Neils
Attorney, Agent, or Firm—Burns, Doane, Swecker & Mathis

[57] ABSTRACT

A heat exchange mat comprises at least a pair of mat members respectively including a heat exchange element and arranged side by side with their one side edges opposed, an elongated link member acting as a partition and linking between the opposed side edges of the mat members while allowing the interior of the respective members to communicate with each other at one longitudinal end of the link member, and means for supplying and discharging a heat exchange fluid to one of the mat members and out of the other member through supply and discharge tubes provided close to each other, the means being mounted to the mat at the other end of the link member, whereby substantially uniform thermal distribution overall the heat exchange mat is attained with remarkable improvement in the heat exchanging efficiency at its installing place.

10 Claims, 15 Drawing Figures

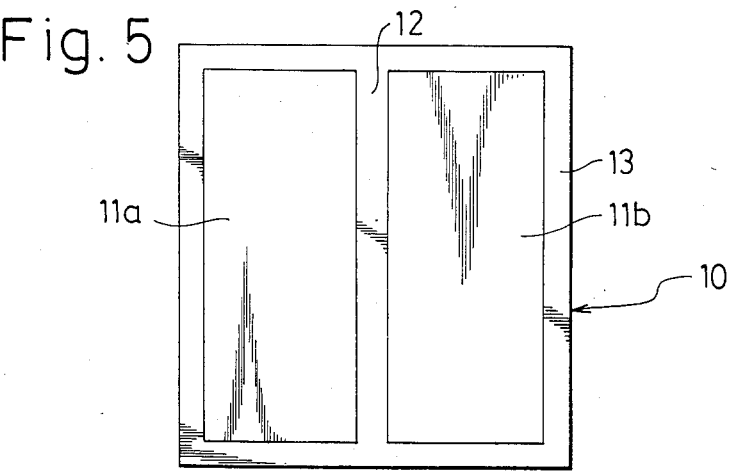
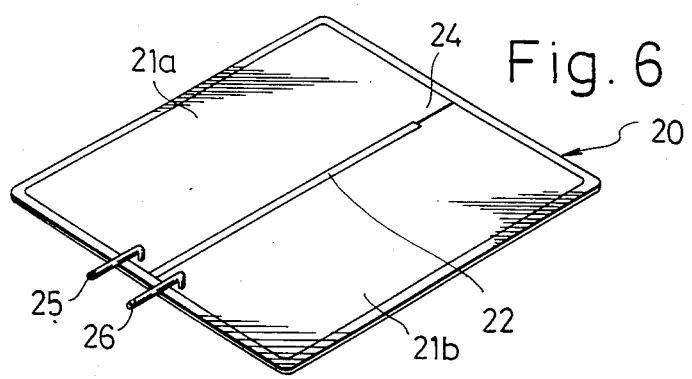
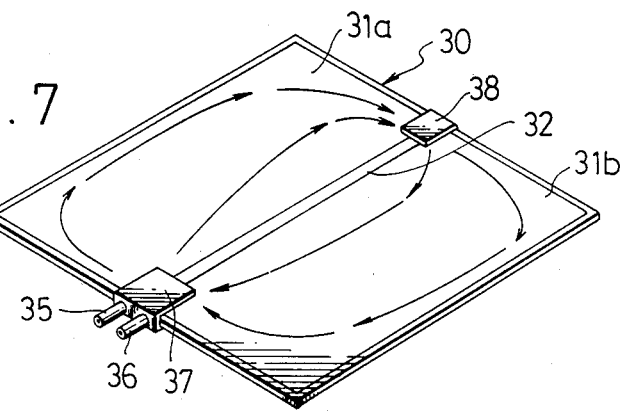

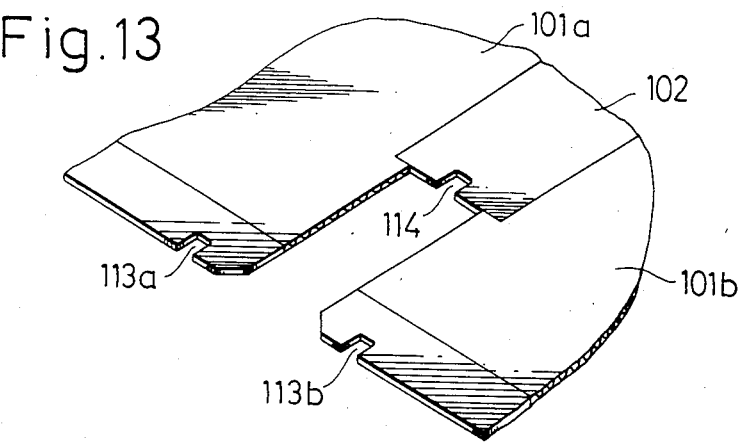
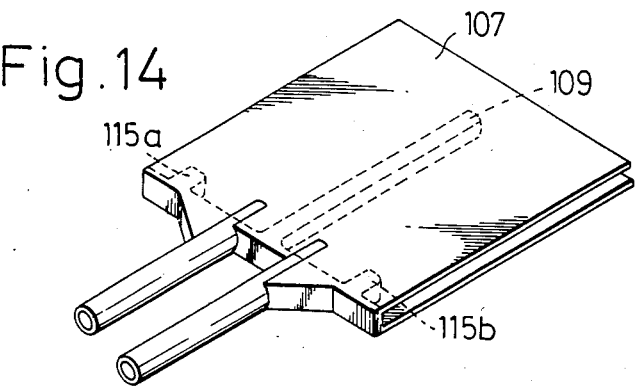
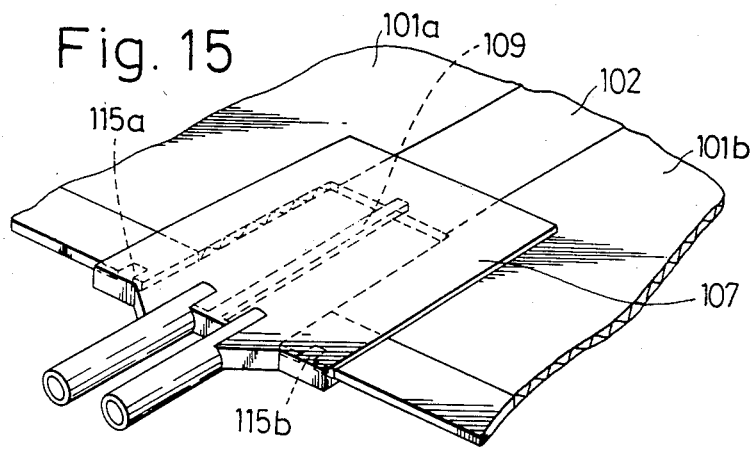

HEAT EXCHANGE MAT

BACKGROUND OF THE INVENTION

This invention relates to mat-shaped heat exchangers employing such heat exchanging fluid as hot water caused to flow therethrough and, more specifically, to a heat exchange mat formed into a flat sheet shape for laying on a floor so as to achieve, for example, floor surface heating with hot water circulated throughout the interior of the mat.

Conventional apparatuses for exchanging heat of a fluid with room air could be disposed only at a corner part of a house room and their heat exchanging efficiency has been insufficient. For this reason, there have been recently developed such flat heat exchange mats that can be laid on a floor or wall surface for exchanging heat with the room air to improve the heat exchanging efficiency. In this case, the heat exchange mat comprises, as shown in FIG. 1, a heat exchanging element 1 of wavy warp and linear weft filaments 2 and 3 of a metal or plastic material and knitted with each other substantially perpendicularly, and a face sheet 5 made of a polyvinyl chloride or the like and bonded to each of top and bottom faces of the element 1 with such an insert 4 as a textile material interposed between them. In firmly bonding the face sheet 5 with the interposed insert 4 to the heat exchanging element 1, usually, a roll pressing force must be applied at least to one of the face sheets 5 so that the force will cause the element 1 to be once compressed to fall down to become smaller in thickness. While the original state of the element 1 can be substantially restored from this compressed state with the restoring force of the filaments specifically when hot water or the like heat exchanging fluid is fed to flow through passages 6 defined between the top and bottom inserts 4, it has been known that the linear weft filaments 3 are caused to be bent downward at their one longitudinal end part and upward at the other end part so that the mat will be wavy at opposing side edges in opposite upward and downward directions as shown in FIG. 2, whereby a problem is caused to arise in that the upward and downward bent edges of the mat laid on the floor give to a user walking on the mat a danger of false step.

On the other hand, there has been suggested in U.S. Pat. No. 4,230,175 a heat exchange mat provided as a flexible sheet adapted to be laid on a flat surface and to be applied to solar water-heater. This mat is provided, however, at both opposing side edges with heat-exchanging-fluid supplying and discharging members which are larger in thickness than the mat itself so that the mat laid on a room floor may also give to the user the same danger of false step at the higher fluid supplying and discharging members. For this reason, too, it has been demanded to provide a heat exchange mat which is evenly flat without any rising part.

DISCLOSURE OF THE INVENTION

A primary object of the present invention is, therefore, to provide a heat exchange mat which eliminates such problems as in the known devices, preventing specifically any deformation of the mat at any side edge thereof so as to attain the overall flatness of the mat suitable for lying on the room floor. This object of the invention can be attained by linking at least a pair of heat exchange mat members together at their one side edge apt to be bent upward upon application of the roll pressing force and opposed to each other, with a link member acting as a partition while allowing the interior of the both mat members to communicate with each other at least at one end part of the link member.

Another important object of the present invention is to provide a heat exchange mat which attains the overall flatness even at the heat-exchanging-fluid supply and discharge means for the pair of heat exchange mat members, minimizing any level difference all over the mat. According to another feature of the present invention, therefore, this object is attained by employing a sufficiently flattened supply and discharge means for the heat exchange fluid to be circulated through the pair of mat members, as provided at the other end of the link member.

Sitll another object of the present invention is to provide a heat exchange mat in which the heat exchanging fluid can smoothly flow between the pair of mat members.

Other objects and advantages of the present invention shall become clear from the following description of the invention detailed with reference to preferred embodiments shown in accompanying drawings.

BRIEF EXPLANATION OF THE DRAWINGS

FIG. 5 is a top plan view of the mat of FIG. 3;

FIGS. 6 through 10 are perspective views of different embodiments of the mat according to the present invention, wherein the heat exchange fluid can flow from one of the pair of heat exchange members of the mat to the other at one end part of a link member between them, and means for supplying and discharging the fluid to and from the mat is provided at the other end part of the link means;

FIGS. 13 and 14 are fragmentary perspective views respectively of the mat members in a further embodiment of the present invention at a part where the fluid supply and discharge means is to be mounted, and of the means before being mounted; and FIG. 15 is a fragmentary perspective view of the mat members and fluid supply and discharge means as mounted thereto in the embodiments of FIGS. 13 and 14.

Figure 1:
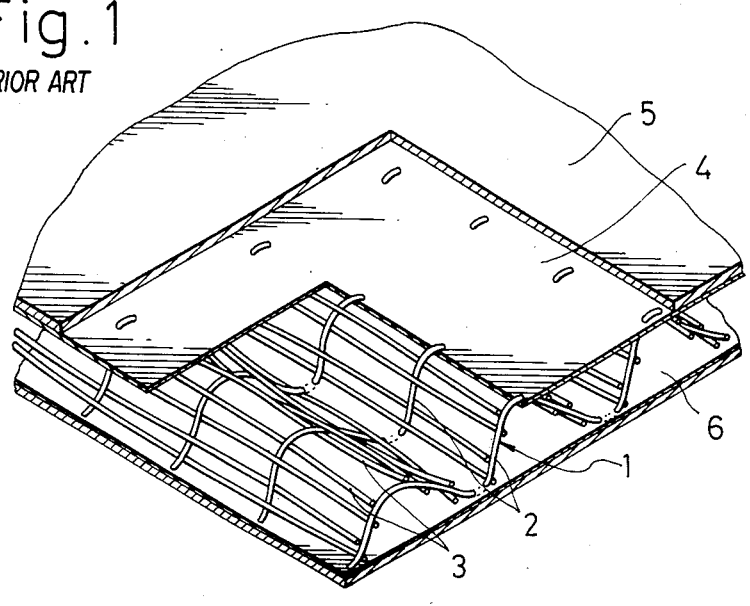
FIG. 1 is a fragmental perspective view with certain parts removed for showing interior structure of a heat exchange mat to which the present invention relates.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims.

DISCLOSURE OF PREFERRED EMBODIMENTS

Figure 2:
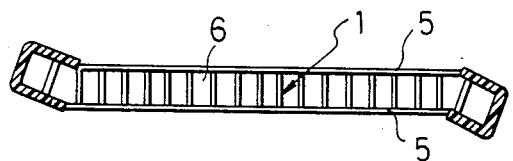
FIG. 2 is a schematic cross sectional view of the heat exchange mat of FIG. 1.
Figure 3:
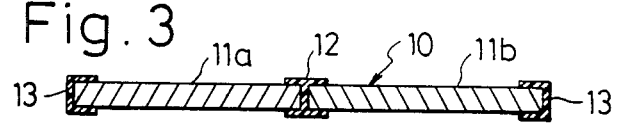
FIG. 3 is a schematic cross sectional view of a mat comprising a pair of heat exchange mat members as linked according to the present invention, in a state before being used.
Figure 4:
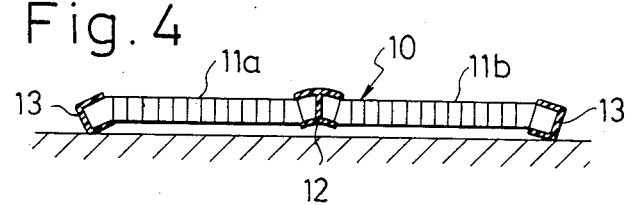
FIG. 4 is a similar schematic cross sectional view of the mat of FIG. 3 but in a state of being used.

Referring to FIGS. 3 to 5, a heat exchange mat 10 comprises, as a remarkable feature of the present invention, a pair of mat members 11a and 11b respectively formed in the manner disclosed with reference to FIG. 1. The members are arranged side by side as opposed at one of their side edges where the linear weft filaments 3 terminate and specifically where each mat member tends to bend upward as has been explained with reference to FIG. 2. These mat members are integrally linked to each other in fluid tight manner by means of a link member 12 of such a plastic material as polyvinyl chloride or the like which is H-shaped in section and extending along the side edge of the mat member. A peripheral sealing member 13 also of such a plastic material as polyvinyl chloride or the like is adhered in fluid tight manner to both face sheets 5 along all other peripheral edges of the mat members 11a and 11b. With this arrangement, the tendency of both mat members 11a and 11b to bend upwardly at the edges (due to the application of the rolling press force for firmly bonding the heat exchange element 1 with the insert 4 and face sheets 5 as explained earlier) can be effectively suppressed by the link member 12 as shown in FIG. 4. Because the danger of false step of the user mostly arises at an upward bent edge of any mat, the heat exchange mat 10 of this arrangement prevents effectively such danger from occurring even when the mat is laid on a room floor surface.

According to another feature of the present invention, the action of the link member 12 as a partition is utilized for rendering the thermal distribution with the heat exchanging fluid supplied into the heat exchange mat to be uniform. Referring to FIG. 6, a link member 22 in a heat exchange mat 20 is partly removed at its one end so that the interior of a pair of mat members 21a and 21b will communicate with each other through a passage 24 provided at the removed end of the link member 22. The sheets 5 are suitably bonded at the passage 24. Tubes 25 and 26 for supplying the heat exchanging fluid into the mat member 21a and discharging the fluid out of the other mat member 21b are fluid tightly coupled to these members, respectively in the vicinity of the other end of the link member 22 and close relation to each other. With such a structure, the heat exchanging fluid supplied into the heat exchange mat 20 through the supply tube 25 can be prevented from being immediately discharged out of the mat through the discharge tube 26, by means of the partitioning link member 22 between the closely disposed tubes, so that the fluid will travel throughout the mat member 21a until it reaches the passage 24 and further throughout the other mat member 21b from the passage 24 to the discharge tube 26. As a result, such local concentration of heat and uneven thermal distribution that the heat exchange is higher at a part near the supply tube 25 but is lower as the heat exchange fluid leaves the tube 25 can be avoided, and a uniform thermal distribution for substantially uniform heat exchange all over the mat can be realized.

Figure 8:
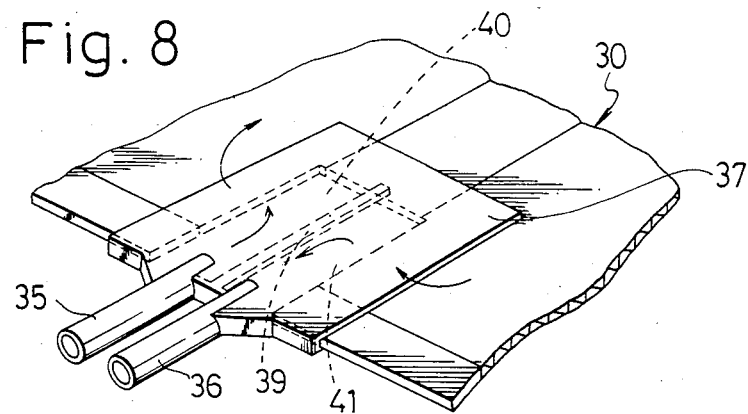

According to still another feature of the present invention, the means for supplying and discharging the heat exchanging fluid is made to be flat so that, in the case where the mat is laid on a room floor surface, the danger, for example, of false step of the user due to a raised provision of such supply and discharge means can be well removed. In the case of the mat of FIG. 6, the mat may be used with less danger when the supply and discharge tubes 25 and 26 are positioned, for example, at a room corner but the mat will lose the freedom of use in respect of its disposition in the room. In order to overcome this, such a heat exchange mat 30 as shown in FIGS. 7 and 8 is suggested, in which a link member 32 made similarly to that of the above embodiment for a pair of mat members 31a and 31b is removed or shortened at its both ends. Joint members 37 and 38 made of such plastic material as polyvinyl chloride or the like are secured fluid tightly to the removed ends of the member 32. Fluid supply and discharge pipes 35 and 36 are provided in one of the joint members, i.e., in the joint member 37, so as to extend out of an outer end face coplanar with the mat 30. The pipes are mutually separated within the member 37 by a partitioning wall 39 which extends from the other inner end face abutting the link member 32 to the outer end face, at intermediate point between the supply and discharge tubes 35 and 36, so as to define in the member 37 fluid supply and discharge paths 40 and 41 divided by the wall 39 to respectively communicate between each interior of the mat member 31a or 31b and the supply tube 35 or discharge tube 36. The other joint member 38 is made hollow and secured at the same position as the passage 24 in the embodiment of FIG. 6, so as to form a passage communicating between the both interiors of the mat members 31a and 31b. Is in the case of FIG. 6, the heat exchanging fluid flows in the directions of arrows shown in FIGS. 7 and 8 so that the uniform thermal distribution of the fluid can be realized, while the freedom of use in the disposition of the mat is well maintained with the fluid supply and discharge means effectively flattened by such provision of the supply and discharge pipes 35 and 36. As the joint members 37 and 38 are mounted to the both shortened ends of the link member 32, the linked end edges of the mat members 31a and 31b can be prevented from causing such upward deformation as has been disclosed, by means of the link and joint members 32, 37 and 38 which are effective to strengthen the mat structure.

Figure 9:
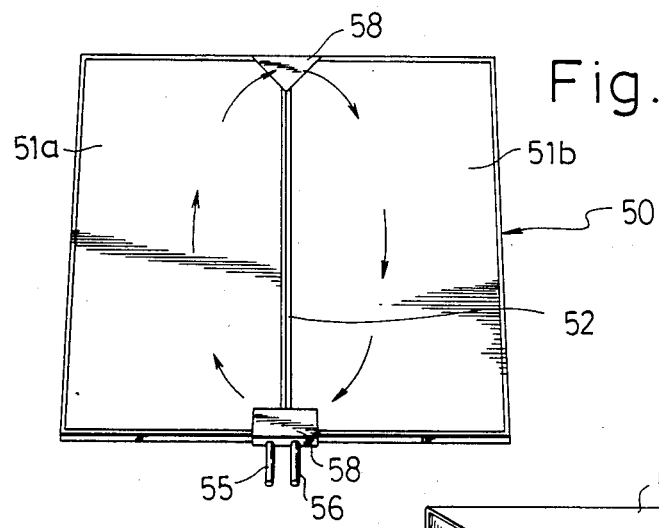
Figure 10:
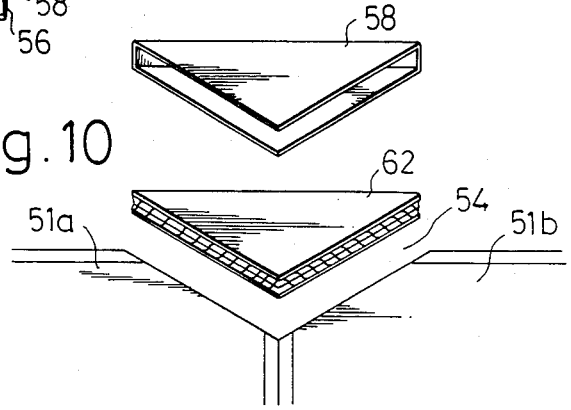

While in the above embodiment the joint member 38 is hollow, a corresponding joint member 58 in a further embodiment of FIGS. 9 and 10 is provided therein with the same heat exchange element as that which forms a pair of mat members 51a and 51b while defining a communication path 54 between them. More specifically, in a heat exchange mat 50 comprising the pair of mat members 51a and 51b linked by a shortened link member 52, a corner part facing the path 54 of both mat members 51a and 51b is cut off diagonally to form a triangular notch at an end part of the link member 52. Complementarily triangular joint member 58 having therein a heat exchange element 62 also of the complementarily triangular shape is fitted into the triangular notch in fluid tight manner with respect to the face sheets and inserts on both surfaces of the mat members 51a and 51b. Operation of the mat 50 is substantially the same as those in FIG. 1 and the foregoing embodiments. In the present embodiment, therefore, the heat exchanging action can be obtained also at the communication path 54 in addition to that attained by the mat members 51a and 51b, thus, with an improvement to the case of FIG. 6 in this respect.

Figure 11:
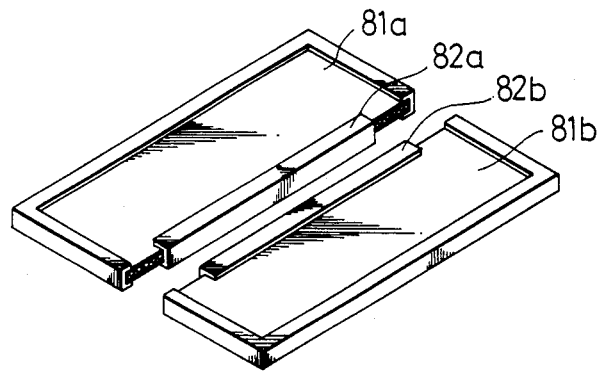
FIG. 11 is a perspective view of another embodiment of the mat according to the present invention employing a different link member for the pair of heat exchange mat members which are shown as separated from each other.

In linking the pair of mat members, further, it is preferable to employ the link member of an H-shaped section, but an alternative measure may be taken as shown in FIG. 11, in which opposed side edges of a pair of mat members 81a and 81b showing the tendency of upward deformation are covered respectively with a pair of shortened link bars 82a and 82b of U-shaped section. The bars are bonded together at their opposed side faces, and then joint members similar to those disclosed in connection with FIGS. 7 and 8 are mounted to remainrng open parts between the mat members 81a and 81b at both ends of the bars 82a and 83b, whereby substantially the same effect as that of the foregoing embodiments can be obtained. While not shown, further, the number of the mat members is not limited only to a pair but any desired number more than that may easily be employed with the same arrangement for forming the heat exchange mat adapted to be laid on a floor. In addition, the mat members have been explained to be rectangular in the respective embodiments disclosed, but a pair of mat members each having, for example, a right triangle may be employed as combined into a rectangle as a whole, in which the link member as well as the joint members are disposed to lie on a diagonal of the rectangle, whereby substantially the same heat exchange mat as in the respective embodiments disclosed can be obtained. Furthermore, although the heat exchange mats have been explained to be flexible, it will be readily appreciated by those skilled in the art that the face sheet may be of a rigid material if necessary.

Figure 12:
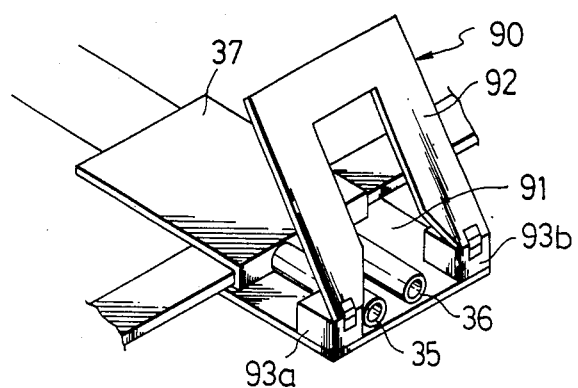
FIG. 12 is a fragmental perspective view at the fluid supply and discharge means of the mat in still another embodiment of the present invention having a featured arrangement for mounting the means to the mat.

In mounting the respective joint members in the respective embodiments of FIGS. 7 to 10, on the other hand, such a jig 90 as shown in FIG. 12 is preferably used. More specifically, in the illustrated jig 90, a movable plate 92 of a U-shaped as viewed from the top is rotatably hinged at both leg ends to raised bosses 93a and 93b provided on both leg ends of also U-shaped stationary plate 91 so that, when the movable plate 92 is rotated to its closed position with respect to the stationary plate 91, both plates 92 and 91 can abut against the top and bottom surfaces of the joint member 37 with or without the fluid supply and discharge tube 35 and 36. When the mat members linked with the link and joint members are subjected to the heat roll press, therefore, the jig 90 is fitted to the joint member prior to the press and removed after the press and cooling of the member and jig, whereby the joint member can be effectively prevented from being thermally deformed or separated from the mat members as fused rather to a heat pressing roller or the like when the joint member is pressed and heated directly.

According to a further feature of the present invention, the assembling efficiency of the mat employing the fluid supply and discharge means of such structure as shown in FIGS. 7 and 8 can be made higher. Referring to FIGS. 13 to 15, mat members 101a, 101b and their link member 102 are formed to be provided, at their end edge on the fluid supply and discharge side, with notches 113a, 113b and 114 respectively, and a joint member 107 having therein a centrally extended partition 109 is made to have short inward projections 115a and 115b symmetrical with respect to the partition 109, so that the tip end of the partition 109 can fit into the notch 114 and the projections 115a and 115b can fit into the notches 113a and 113b With such an arrangement, when the joint member 107 of FIG. 14 is mounted to the mat members of FIG. 13, the notches 113a, 113b and 114 thus receiving respectively the projections 115a and 115b and tip end of the partition 109 perform a favourable guiding and positioning action so as to provide a high assemblability to the mat of the present invention.

What is claimed as our invention is:

1. A floor heat exchange mat comprising at least a pair of flexible mat members, each mat member including top and bottom face sheets defining an interior space therebetween, a pair of inserts disposed within said interior space, and heat exchanger means disposed between said inserts, said heat exchanger means including wavy warp and linear weft filaments knitted substantially perpendicularly with each other for allowing a heat exchange fluid to flow through the interior space of said mat member, each mat member including a plurality of side edges, one of said side edges at which said weft filaments terminate being inherently upwardly biased relative to remaining portions of said mat member in response to being heated by the heat exchange fluid, said mat members arranged such that said upwardly biased edges lie side-by-side, and linking means extending along both said upwardly biased edges and joining such edges together, said linking means including upstanding wall means defining a fluid partition between the interiors of said mat members, and sealing means extending around, and sealing, the peripheral edges of said linked mat members, and conducting means for conducting the heat exchange fluid into and from said mat members.

2. A heat exchange mat according to claim 1, wherein one end of said linking means terminates short of an end of said upwardly biased edges to permit fluid to flow between the interiors of said mat members.

3. A heat exchange mat according to claim 2, wherein said conducting means includes fluid supply means communicating with the interior of one of said mat members adjacent another end of said wall means opposite said one end thereof, and fluid discharge means communicating with the interior of the other mat member adjacent said other end of said wall means.

4. A heat exchange mat according to claim 1, wherein both ends of said linking means terminate short of respective ends of said upwardly biased edges, and a pair of joint members secured to the ends of said linking means for joining said mat members together and intercommunicating the interiors thereof, said conducting means including fluid supply means and fluid discharge means connected to one of said joint members.

5. A heat exchange mat according to claim 4, wherein said fluid supply means and fluid discharge means each comprises a tube projecting from said one joint member coplanar with said mat members.

6. A heat exchange mat according to claim 5, wherein said one joint member forms a fluid supply path communicating said fluid supply tube with one of said mat members, and a fluid discharge path communicating said fluid discharge tube with the other mat member.

7. A heat exchange mat according to claim 4, wherein the other joint member includes heat exchange means therein and is of triangular shape.

8. A heat exchange mat according to claim 4, wherein said linking means is an elongated member of H-shape in cross-section.

9. A heat exchange mat according to claim 4, wherein said linking means comprises a pair of elongated members of U-shape cross-section, each elongated member including a pair of parallel legs and a wall interconnecting said legs, said legs extending over and under the associated mat member, and the walls of said elongated members being secured together.

10. A heat exchange mat according to claim 1, wherein said linking means is arranged to resist relative rotational movement between said mat members.

* * * * *